US012680648B2

(12) United States Patent
Phillips

(10) Patent No.: US 12,680,648 B2
(45) Date of Patent: Jul. 14, 2026

(54) SHAFT GUARD FOR A MACHINE

(71) Applicant: Dodge Industrial, Inc., Oxford, CT (US)

(72) Inventor: Jonathan Phillips, Greenville, SC (US)

(73) Assignee: Dodge Industrial Inc., Oxford, CT (US)

( * ) Notice: Subject to any disclaimer, the term of this patent is extended or adjusted under 35 U.S.C. 154(b) by 590 days.

(21) Appl. No.: 18/138,775

(22) Filed: Apr. 25, 2023

(65) Prior Publication Data

US 2023/0341087 A1  Oct. 26, 2023

Related U.S. Application Data

(60) Provisional application No. 63/334,875, filed on Apr. 26, 2022.

(51) Int. Cl.
F16P 1/02 (2006.01)
F16D 3/84 (2006.01)

(52) U.S. Cl.
CPC ................ F16P 1/02 (2013.01); F16D 3/843 (2013.01); *F16D 2300/26* (2013.01); *Y10T 74/2191* (2015.01); *Y10T 403/32451* (2015.01)

(58) Field of Classification Search
CPC . A01B 71/08; F16D 3/84; F16D 3/841; F16D 3/843; F16D 2300/26; F16P 1/02; Y10T 74/219; Y10T 74/2191; Y10T 403/17; Y10T 403/32451; Y10T 403/32491
USPC .......... 464/170; 403/23, 107, 109.4; 74/608, 74/609
See application file for complete search history.

(56) References Cited

U.S. PATENT DOCUMENTS

| | | | | |
|---|---|---|---|---|
| 1,012,909 | A | * | 12/1911 | Podeyn ................... F16D 3/841 |
| | | | | 464/170 |
| 1,185,743 | A | | 6/1916 | Warstler |
| 1,797,602 | A | | 3/1931 | Bryson |
| 3,704,959 | A | | 12/1972 | John |
| 3,866,825 | A | | 2/1975 | Balazer et al. |
| 4,411,636 | A | * | 10/1983 | Buthe ..................... F16D 3/841 |
| | | | | 464/175 |
| 4,749,215 | A | * | 6/1988 | Martin ................ F16L 27/1275 |
| | | | | 285/298 |
| 5,007,881 | A | * | 4/1991 | Hazebrook ............. F16D 3/848 |
| | | | | 464/170 |

(Continued)

FOREIGN PATENT DOCUMENTS

| | | | | | |
|---|---|---|---|---|---|
| EP | | 0918951 B1 | * | 9/2022 | ............. F16D 3/841 |
| FR | | 2142102 A1 | * | 1/1973 | ............. F16D 3/841 |
| WO | WO-2008126791 A1 | | * | 10/2008 | ............. F16D 3/841 |

*Primary Examiner* — Josh Skroupa

(74) *Attorney, Agent, or Firm* — Ruggiero McAllister & McMahon LLC; Edward L McMahon

(57) ABSTRACT

A shaft guard for a machine includes a base that has a mounting segment configured to be secured to a stationary part of the machine and a longitudinal segment that extends outwardly from the mounting segment and terminates at a distal end thereof. The longitudinal segment has first non-helical threads on a portion thereof. The shaft guard includes a shaft cover that extends longitudinally from a connection end to a free end thereof. The shaft cover has a second non-helical threads on a portion thereof. One or more of the first non-helical threads engage respective ones of the second non-helical threads to secure the shaft cover to the base.

20 Claims, 10 Drawing Sheets

SECTION A-A

(56)                References Cited

U.S. PATENT DOCUMENTS

| | | | | |
|---|---|---|---|---|
| 5,385,373 | A * | 1/1995 | Love | F16B 41/007 |
| | | | | 403/313 |
| 5,533,806 | A | 7/1996 | Veltrop et al. | |
| 6,123,622 | A * | 9/2000 | Mikeska | F16D 3/84 |
| | | | | 464/172 |
| 6,190,261 | B1 * | 2/2001 | Powell | F16D 3/843 |
| | | | | 464/170 |
| 6,203,440 | B1 * | 3/2001 | Bondioli | F16D 3/841 |
| | | | | 403/23 |
| 6,241,618 | B1 | 6/2001 | Doll | |
| 6,357,172 | B1 * | 3/2002 | Risgaard | A01G 13/28 |
| | | | | 47/32.4 |
| 7,066,209 | B2 | 6/2006 | Imai | |
| 7,585,138 | B2 | 9/2009 | Clark et al. | |
| 7,758,433 | B2 * | 7/2010 | Yamauchi | F16D 3/843 |
| | | | | 464/173 |
| 7,798,213 | B2 * | 9/2010 | Harvey | E21B 17/07 |
| | | | | 403/107 |
| 8,025,577 | B2 | 9/2011 | LeBarge, III | |
| 8,839,594 | B2 * | 9/2014 | Smith | H02G 3/088 |
| | | | | 52/220.8 |
| 9,863,498 | B1 | 1/2018 | Westhoff, Jr. et al. | |
| 9,915,294 | B2 | 3/2018 | Littau et al. | |
| 10,030,814 | B2 | 7/2018 | Wei et al. | |
| 10,107,380 | B2 * | 10/2018 | McGarry | F16D 3/843 |
| 10,309,466 | B2 * | 6/2019 | Littau | F16D 3/841 |
| 11,796,009 | B1 * | 10/2023 | Hunter | F16D 3/841 |
| 2010/0130340 | A1 | 5/2010 | Denk | |
| 2013/0213516 | A1 | 8/2013 | Clem et al. | |
| 2016/0252139 | A1 * | 9/2016 | Colombini | F16D 3/843 |
| | | | | 464/173 |
| 2021/0071719 | A1 * | 3/2021 | Burgess | F16D 3/841 |

* cited by examiner

SECTION A-A

DETAIL B

SHAFT GUARD FOR A MACHINE

CROSS REFERENCE TO RELATED APPLICATION

This application claims the benefit of prior-filed, U.S. Provisional Patent Application No. 63/334,875, filed on Apr. 26, 2022, the entire contents of which is incorporated herein by reference in its entirety.

FIELD OF THE INVENTION

The present invention is directed to a shaft guard for a machine having a rotating shaft and more particularly to a segmented shaft guard that has a mounting segment and a shaft cover secured to the mounting segment via a non-helical thread arrangement, for example, a non-helical tapered trapezoidal thread arrangement.

BACKGROUND

Various machines such as motors, gear boxes and centrifugal compressors having rotatable shafts extending therefrom and which are generally exposed to the surroundings. The rotatable shafts pose a safety hazard to personal who work in close proximity to the shaft. In addition, the shafts can be subject to damage from projectiles and debris. Some shafts extend relatively long lengths from the machine and the lengths can vary from one machine to another. In some machines, such as a centrifugal compressor, a rotatable shaft extends between a motor and the compressor and the distance between the motor and the compressor defines the length of the exposed portion of the shaft.

Prior art shaft covers tend to sag due to the weight of the cover and risk engaging the rotatable shaft. Installation of prior art shaft covers on machines can be difficult because the shaft cannot be easily removed from the machine to be fitted with a shaft cover. In addition, prior art shaft covers are typically custom made to fit a predetermined length of the exposed portion of the shaft. Some prior art shaft covers have large openings on opposing axial ends thereof which could allow unsafe access to the rotating shaft and make it impossible to comply with OSHA standards.

Thus, there is a need for an improved shaft guard that addressed the problems described above.

SUMMARY

According to aspects illustrated herein, there is disclosed herein a shaft guard for a machine. The shaft guard includes a base that has a mounting segment configured to be secured to a stationary part of the machine and a longitudinal segment that extends outwardly from the mounting segment and terminates at a distal end thereof. The longitudinal segment includes a first non-helical threads on a portion thereof. The shaft guard includes a shaft cover that extends longitudinally from a connection end to a free end thereof. The shaft cover includes second non-helical threads on a portion thereof. One or more of the first non-helical threads engage a respective one of the second non-helical threads to secure the shaft cover to the base.

In some embodiments, the first non-helical threads include first non-helical tapered trapezoidal threads and the second non-helical threads include second non-helical tapered trapezoidal threads.

In some embodiments, the first non-helical tapered trapezoidal threads have a first pitch diameter and the second non-helical tapered trapezoidal threads have a second pitch diameter. The first pitch diameter and the second pitch diameter have interference fit magnitudes.

In some embodiments, the base and/or the shaft cover are manufactured from a thermosetting polymer and via an injection molding process.

In some embodiments, the shaft guard includes an incremental adjustment feature configured to selectively adjust a longitudinal position of the shaft cover relative to the base.

In some embodiments, the incremental adjustment feature includes selective engagement of a first predetermined number of the first non-helical tapered trapezoidal threads for engagement with a second predetermined number of the second non-helical tapered trapezoidal threads.

In some embodiments, the base includes a first base segment and a second base segment that longitudinally abut one another.

In some embodiments, the shaft cover includes a first shaft cover segment and a second shaft cover segment that longitudinally abut one another.

In some embodiments, the first shaft cover segment and the second shaft cover segment include longitudinal lips that engage one another.

In some embodiments, the first non-helical tapered trapezoidal threads are formed on an exterior surface of the base and the second non-helical tapered trapezoidal threads are formed on an interior surface of the shaft cover.

In some embodiments, the first non-helical tapered trapezoidal threads are formed on an interior surface of the base and the second non-helical tapered trapezoidal threads are formed on an exterior surface of the shaft cover.

In some embodiments, the mounting section includes a radially outwardly extending circumferential flange.

In some embodiments, the shaft cover is cantilever supported by the base.

In some embodiments, the shaft cover includes a radially inward extending circumferential flange.

Any of the foregoing embodiments may be combined.

BRIEF DESCRIPTION OF THE DRAWINGS

Referring now to the Figures, which are exemplary embodiments, and wherein the like elements are numbered alike.

DETAILED DESCRIPTION

Figure 1:
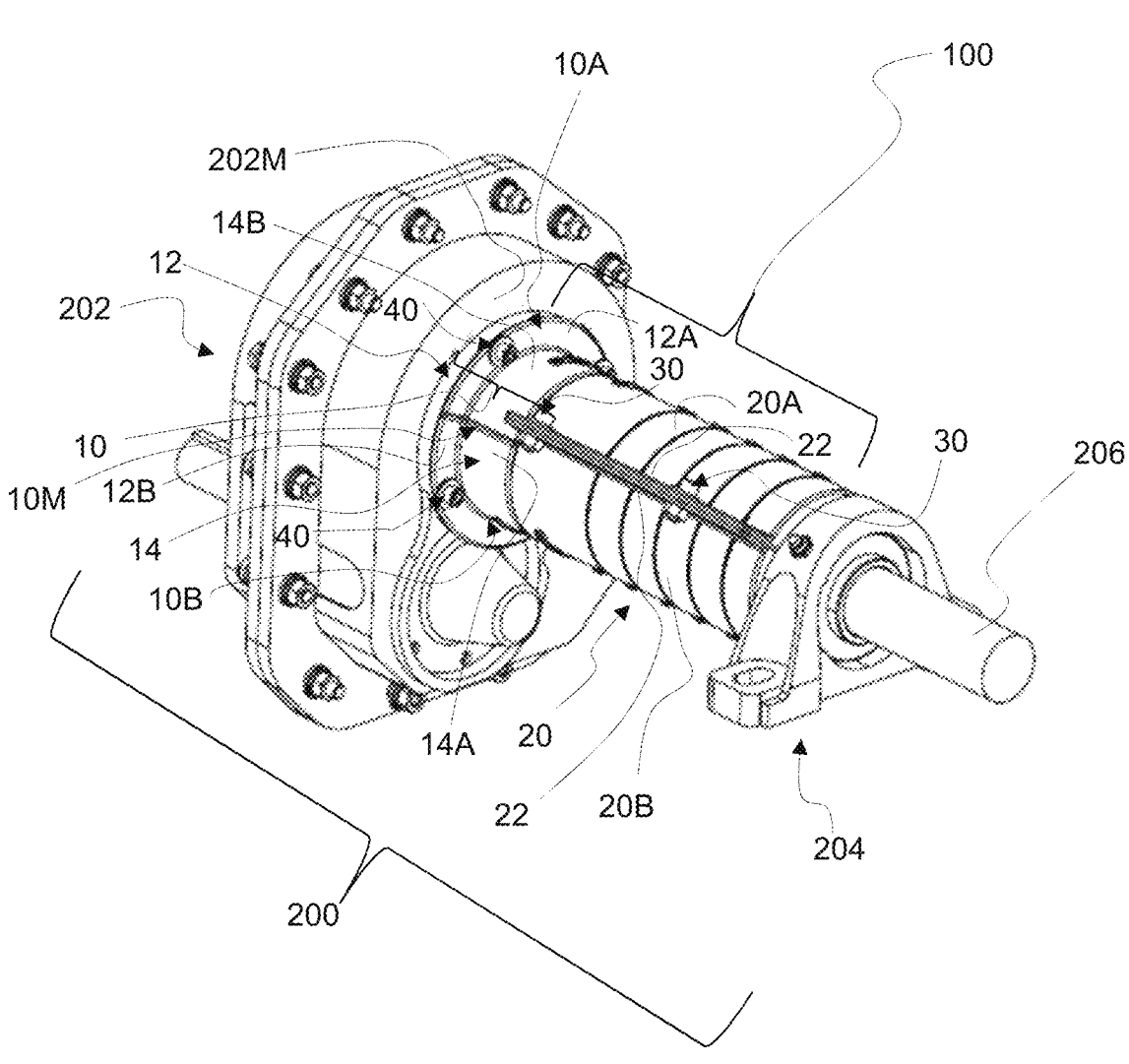
FIG. 1 is a perspective view of the shaft guard of the present invention installed on a machine.
Figure 2:
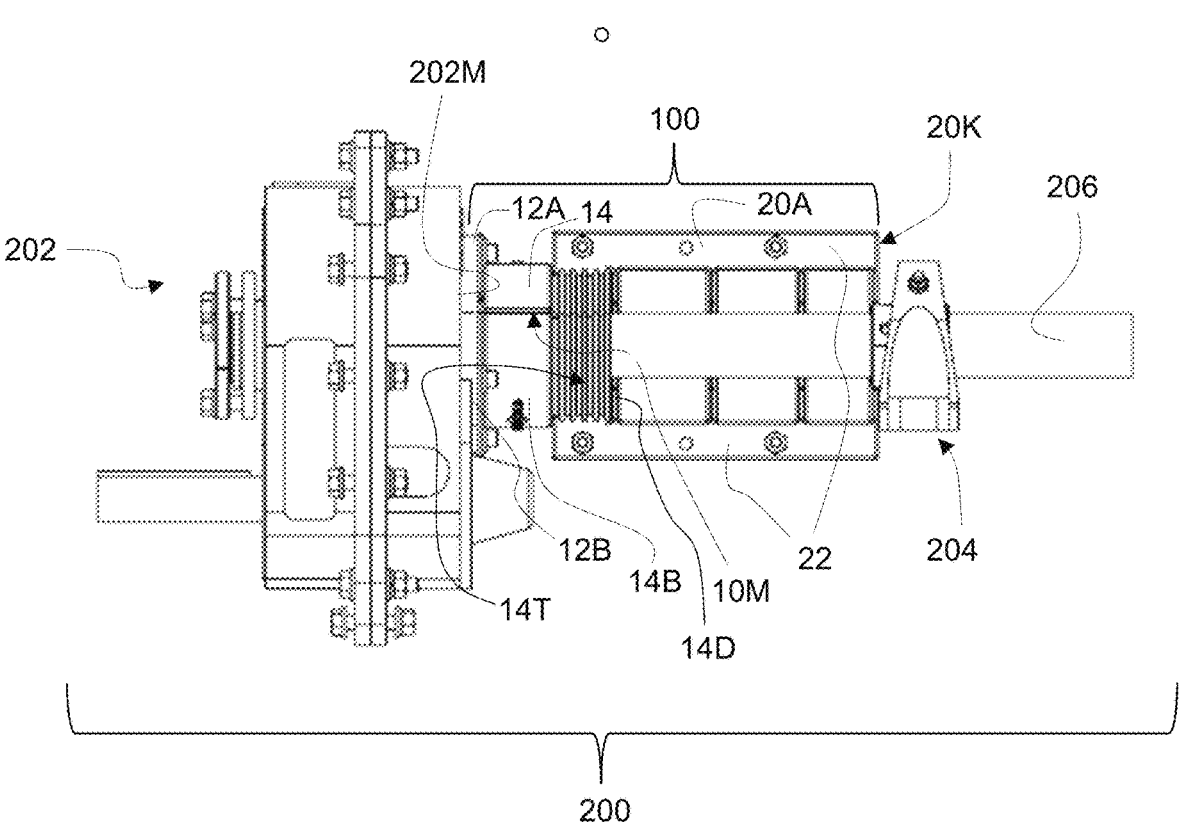
FIG. 2 is a front view of the shaft guard of the present invention installed on a machine shown with one of the two shaft cover segments removed.
Figures 5, 6:
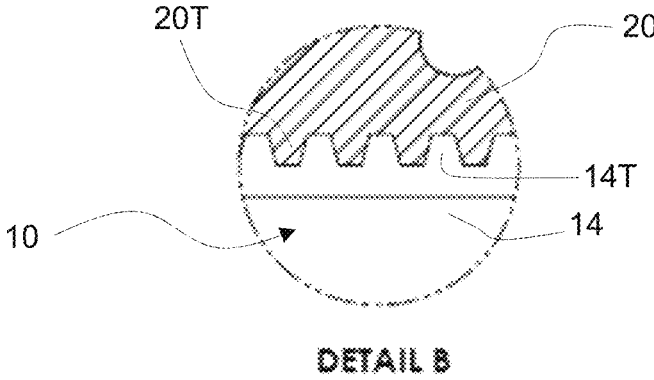
FIG. 5 is a cross sectional view of the shaft guard of the present invention taken in view of A-A of FIG. 4.
FIG. 6 is an enlarged view of detail B of FIG. 5.
Figure 14:
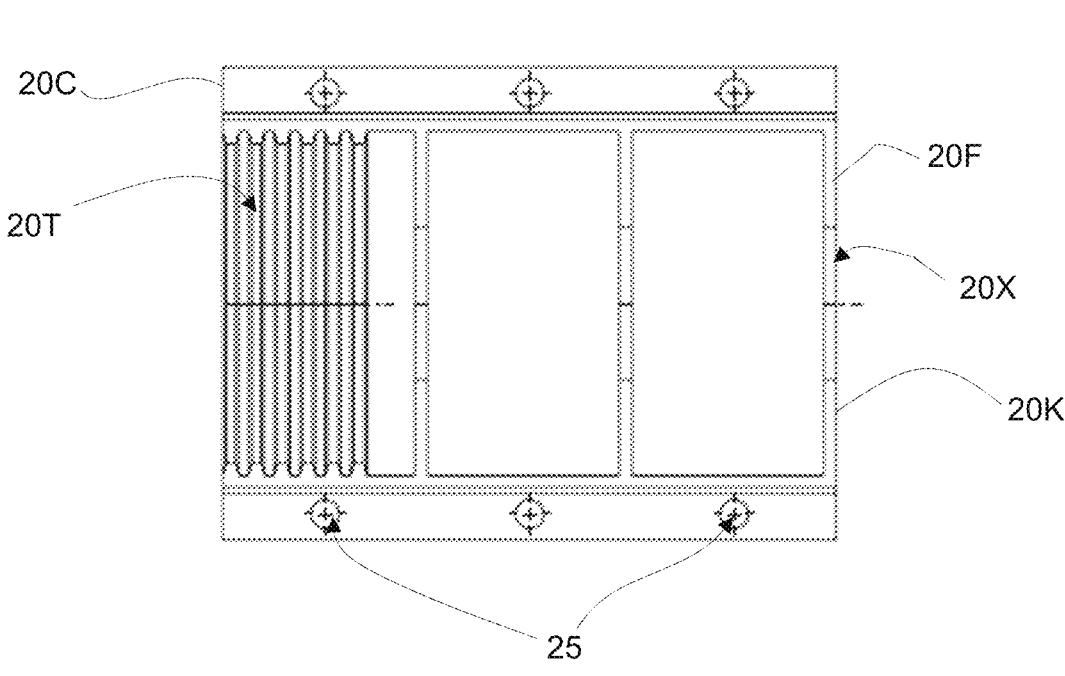
FIG. 14 is a cross sectional view of the shaft cover of FIG. 12.
Figure 15:
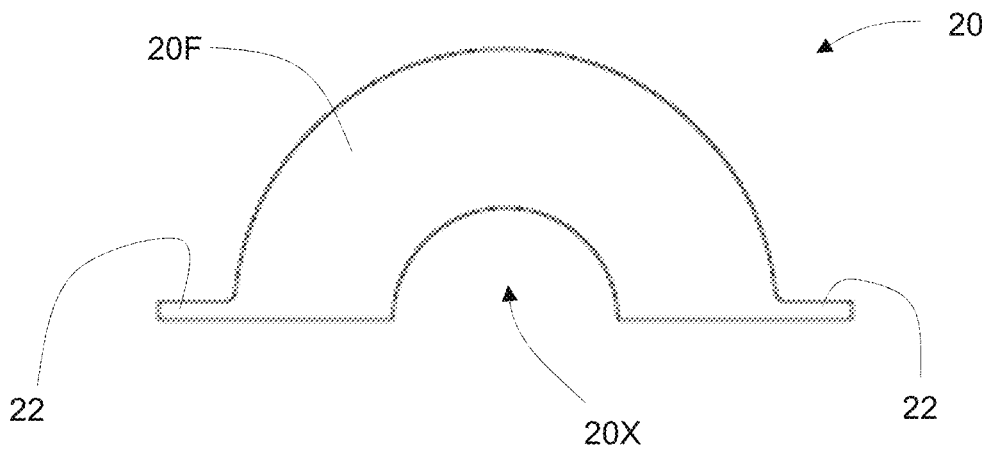
FIG. 15 is and end view of the shaft cover of FIG. 12.

As shown in FIGS. 1 and 2, a shaft guard for a machine 200 is generally designated by the numeral 100. The shaft guard 100 includes a base 10 comprising a mounting segment 12 configured to be secured to a stationary part 202M (e.g., an axial exterior surface of a gear box) of the machine 200. The shaft guard 100 includes a longitudinal segment 14 that extends outwardly from the mounting segment 12 (also referred to as 12A and 12B) and terminates a distal end 14D thereof. The longitudinal segment 14 includes first non-helical threads, for example, first non-helical tapered trapezoidal threads 14T (see FIG. 2). The shaft guard 100 includes a shaft cover 20 that extends longitudinally from a connection end 20C to a free end 20K thereof, as shown in FIG. 14. The shaft cover 20 includes second non-helical threads, for example, second non-helical tapered trapezoidal threads 20T (see FIG. 14). One or more of the first non-helical tapered trapezoidal threads 14T (see FIG. 6) engage a respective one or ones of the second non-helical tapered trapezoidal threads 20T (see FIG. 6) to secure the shaft cover 20 to the base 10, as described further herein.

Figure 8:
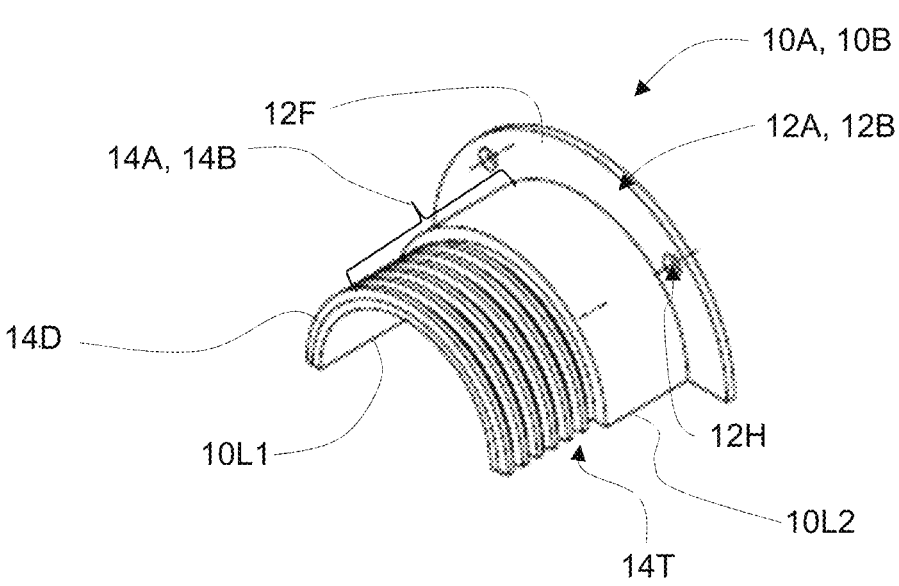
FIG. 8 is a perspective view of base segment of the base of FIG. 1.
Figures 9, 10:
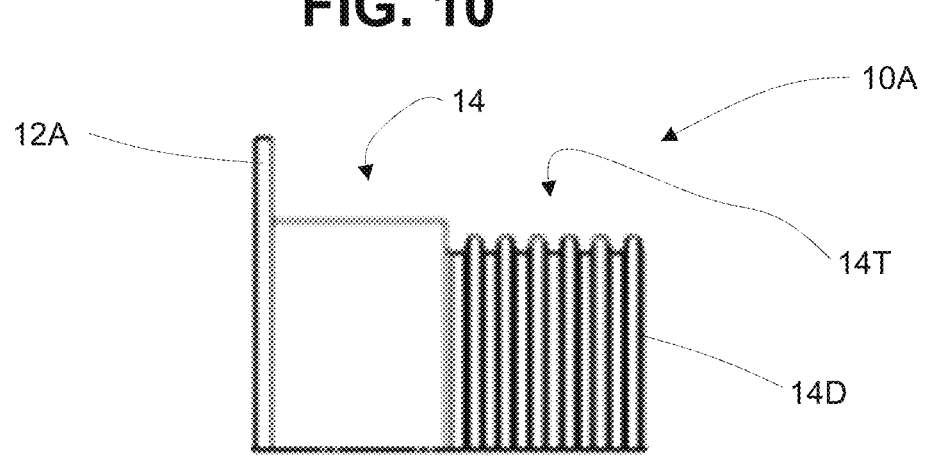
FIG. 9 is a top view of base segment of the base of FIG. 8.
FIG. 10 is a side view of base segment of the base of FIG. 8.
Figure 11:
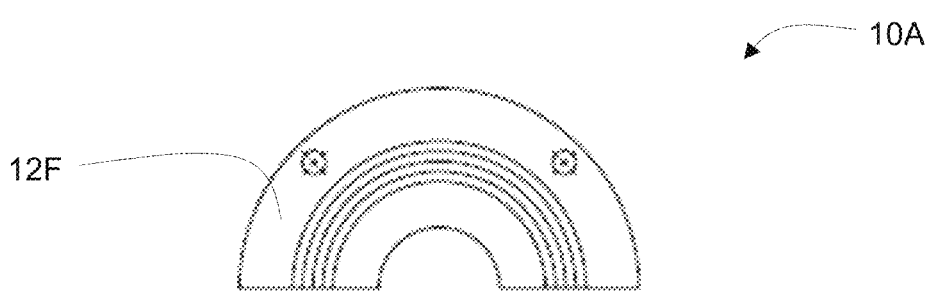
FIG. 11 is an end view of base segment of the base of FIG. 8.

As shown in FIGS. 1-4, the base 10 of the shaft guard 100 has first base segment 10A and a second base segment 10B that longitudinally abut one another along a pair of interface seam lines 10M (only one seam line shown). As best shown in FIG. 8, the first base segment 10A forms one circumferential half of the base 10 and extends 180 degrees from a first axially extending edge 10L1 to a second axially extending edge 10L2; and the second base segment 10B forms a second circumferential half of the base 10 and extends 180 degrees from a first axially extending edge 10L1 to a second axially extending edge 10L2. The first base segment 10A has a first mounting segment 12A and a first longitudinal segment 14A; and the second base 10B has a second mounting segment 12B and a second longitudinal segment 14B. The first axially extending edge 10L1 of the first base segment 10A abuts the second axially extending edge 10L2 of the second base segment 10B to form one of the pair interface lines 10M; and second axially extending edge 10L2 of the first base segment 10A abuts the first axially extending edge 10L1 of the second base segment 10B to form the second of the pair of interface lines 10M. In some embodiments, the first and second pairs of interfacing lines 10M are aligned with (e.g., parallel to) a vertical plane. In some embodiments, the first and second pairs of interfacing lines 10M are aligned with (e.g., parallel to) a horizontal plane. In some embodiments, the first and second pairs of interfacing lines 10M are offset from a vertical plane and offset from a horizontal plane.

As shown in FIG. 8, the mounting segments 12A and 12B have a radially outwardly extending circumferential flange 12F formed thereon. Each of the flanges 12F of the mounting segments 12A, 12B of the first base segment 10A, and second base segment 10B, respectively have a plurality of axially extending holes 12H therein. As shown in FIG. 1, the base 10 is secured to the stationary part 202M of the machine 200 by fasteners 40, which extend through a respective hole 12H in the flange 12F.

While the first base segment 10A is shown and described as forming one circumferential half of the base 10 and the second base segment 10B forming a second circumferential half of the base 10, the present invention is not limited in this regard as the base 10 may be formed of more than two base segments. Forming the base 10 in two or more base segments facilitates installation of the base 10 around a shaft 206 of the machine as shown in FIGS. 1 and 2.

Figure 3:
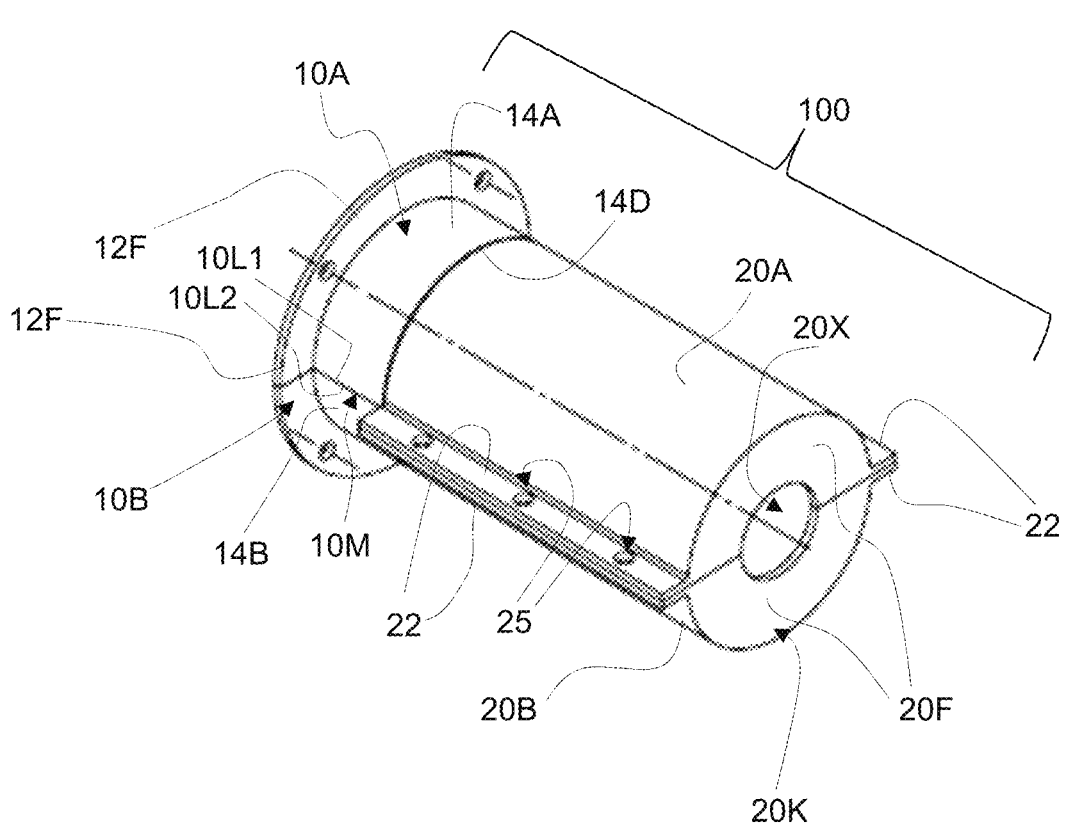
FIG. 3 is a perspective view of the shaft guard of the present invention.
Figure 4:
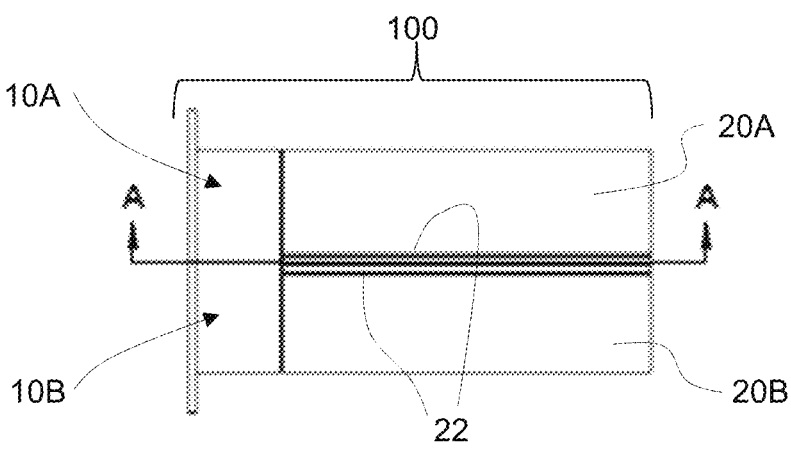
FIG. 4 is a front view of the shaft guard of the present invention.

As best shown in FIG. 3, the shaft cover 20 includes a first shaft cover segment 20A and that forms one circumferential half of the shaft cover 20; and a second shaft cover segment 20B that forms a second circumferential half of the shaft cover 20. The first shaft cover segment 20A extends 180 degrees from an axial extending lip 22 to another axially extending lip 22; and the second shaft cover segment 20B extends 180 degrees from an axial extending lip 22 to another axially extending lip 22. Each of the lips 22 extend radially outward from the first shaft cover segment 20A and each of the lips 22 extend radially outward from the second shaft cover segment 20B. Respective pairs of the lips 22 on the first shaft cover segment 20A longitudinally abut respective pairs pf the lips 22 on the second shaft cover segment 20B. Each of the lips 22 have holes 25 extending there through and the holes 25 of the first shaft cover segment 20A align with the holes 25 of the second shaft cover segment 20B. As shown in FIG. 1, the lips 22 are secured to one another by fasteners 30 that extend through the holes 25 (see FIG. 3) in the lips 22. In some embodiments, the lips 22 are aligned with (e.g., parallel to) a vertical plane. In some embodiments, the lips 22 are aligned with (e.g., parallel to) a horizontal plane. In some embodiments, the lips 22 are offset from a vertical plane and offset from a horizontal plane. In some embodiments, the lips 22 are aligned with (e.g., parallel to) the first and second pairs of interfacing lines 10M. In some embodiments, the lips 22 are offset from the first and second pairs of interfacing lines 10M.

Figure 7:
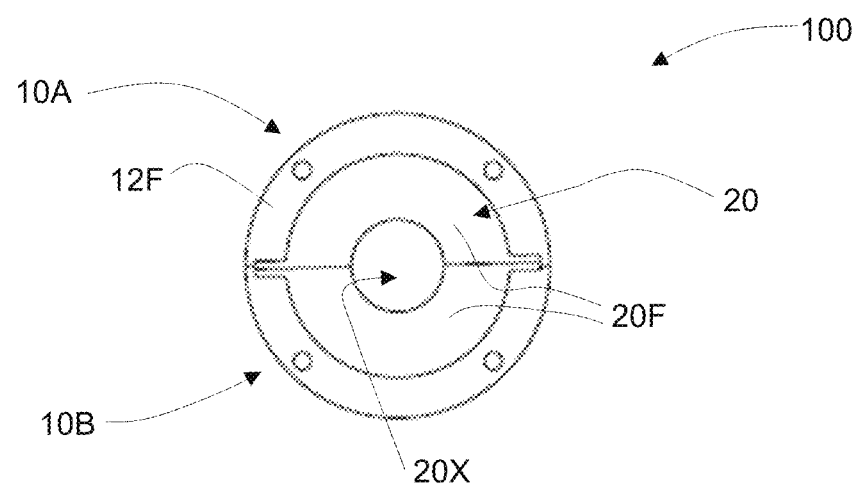
FIG. 7 is an end view of the shaft guard of the present invention taken in view 7-7 of FIG. 5.
Figure 12:
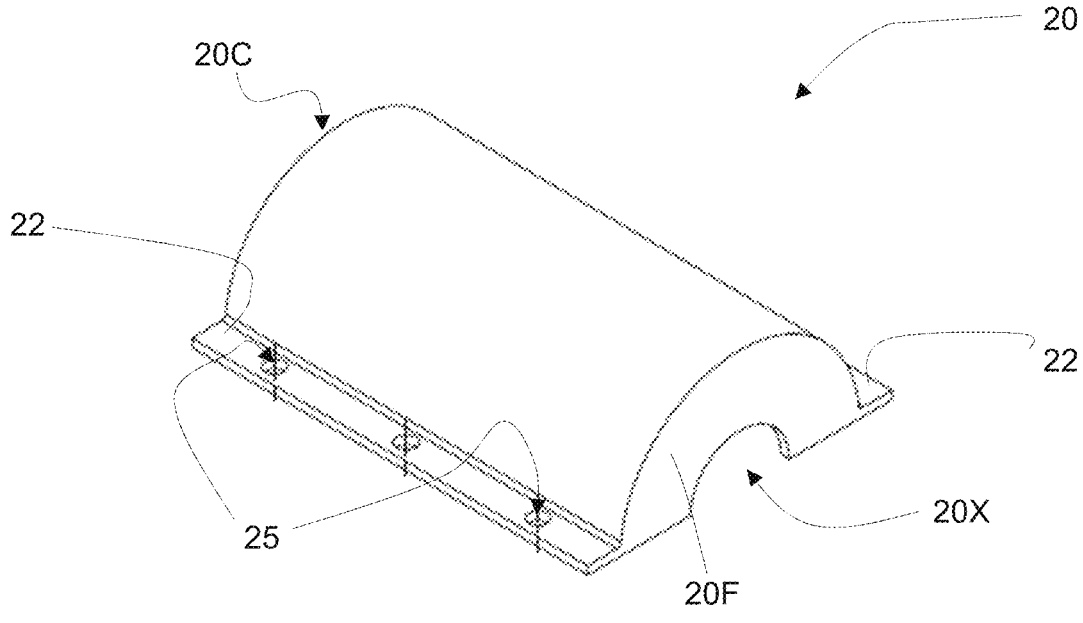
FIG. 12 is a perspective view of the shaft cover of the shaft guard of FIG. 1.
Figure 13:
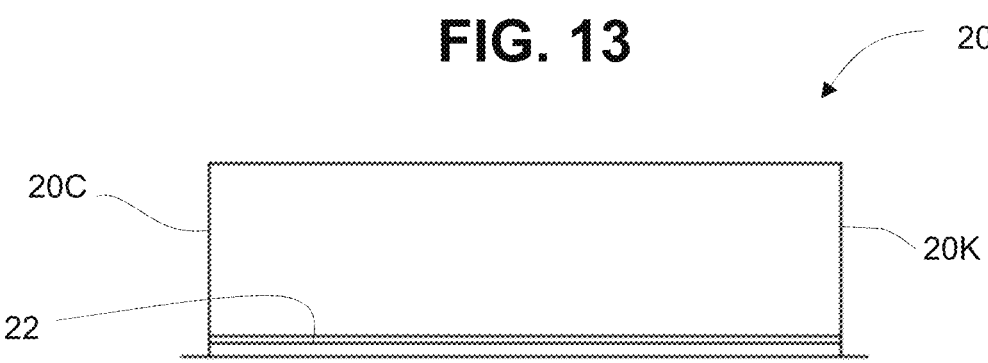
FIG. 13 is a side view of the shaft cover of FIG. 12.

As shown in FIGS. 3, 7, and 12, the shaft cover 20 has a radially inward extending circumferential flange 20F extending from a free end 20K thereof. The flange 20F has an opening 20X (e.g., two semi-circular openings cooperating to form a circular opening) for the shaft 206 (e.g., rotating shaft) to extend therethrough. The shaft cover 20 has utility as a safety measure in protecting personal from inadvertently engaging the rotating shaft 206 and to protect the shaft 206 from damage resulting from impact by projectiles. The opening 20X has an inside diameter G4 (see FIG. 16) that is selected to be slightly greater than the diameter of the shaft 206 to prevent personal from accessing the rotating shaft 206.

While the shaft cover 20 is shown and described as being formed of the first shaft segment 20A and the second shaft segment 20B, the present invention is not limited in this regard as the shaft cover 20 may be formed of two or more shaft cover segments. Forming the shaft cover 20 in two or more shaft cover segments facilitates installation of the shaft cover 20 on the base 10 and around the shaft 206 of the machine as shown in FIGS. 1 and 2.

Figure 17:
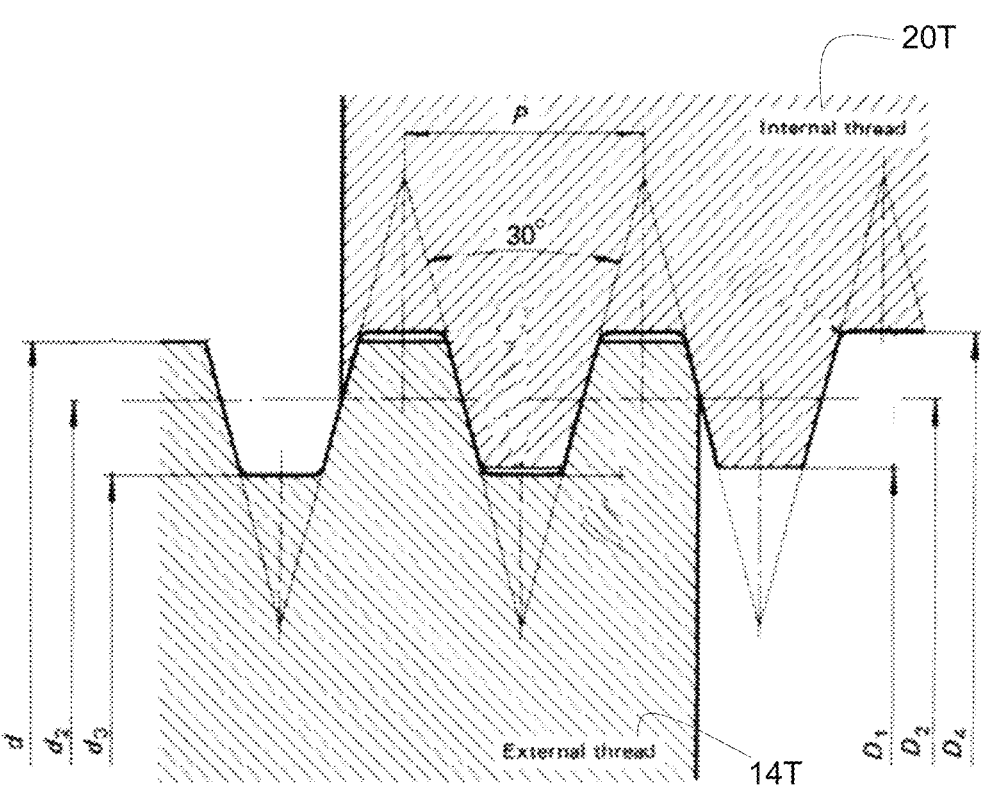
FIG. 17 is schematic view of the threaded portions of the shaft guard of FIG. 1.

As shown in FIG. 17, the first non-helical tapered trapezoidal threads 14T have a first pitch diameter $d_2$ and the second non-helical tapered trapezoidal threads 20T have a second pitch diameter $D_2$. The first pitch diameter $d_2$ and the second pitch diameter $D_2$ having interference fit magnitudes. For example, the first pitch diameter $d_2$ is greater than the second pitch diameter $D_2$ which has utility in retaining the shaft cover 20 in a stable secured attachment to the base 10, including configurations in which the weight of the shaft cover 20 is cantilever supported by the base 10. The first non-helical tapered trapezoidal threads 14T are formed on an exterior surface 10E of the base 10 and the second non-helical tapered trapezoidal threads 20T are formed on an interior surface 20E of the shaft cover 20. However, the present invention is not limited in this regard as in some embodiments, the first non-helical tapered trapezoidal threads are formed on an interior surface of the base 10 and the second non-helical tapered trapezoidal threads are formed on an exterior surface of the shaft cover 20.

As shown in FIG. 17, the first non-helical tapered trapezoidal threads 14T have a major diameter d and a minor diameter $d_3$; and the second non-helical tapered trapezoidal threads 20T have a major diameter $D_4$ and a minor diameter $D_1$. The pitch of the first non-helical tapered trapezoidal threads 14T and the second non-helical tapered trapezoidal threads 20T in FIG. 17 is designated by reference element P. In some embodiments, the pitch is ¼ inch.

In some embodiments, the base 10 and/or the shaft cover 20 are manufactured via an injection molding process. The inventors have surprising discovered that having the first non-helical tapered trapezoidal threads 14T and the second non-helical tapered trapezoidal threads 20T facilitates manufacturing the base 10 and the shaft cover 20 via the injection molding process as the base 10 and the shaft cover 20 release readily from the mold after solidification.

Figure 16:
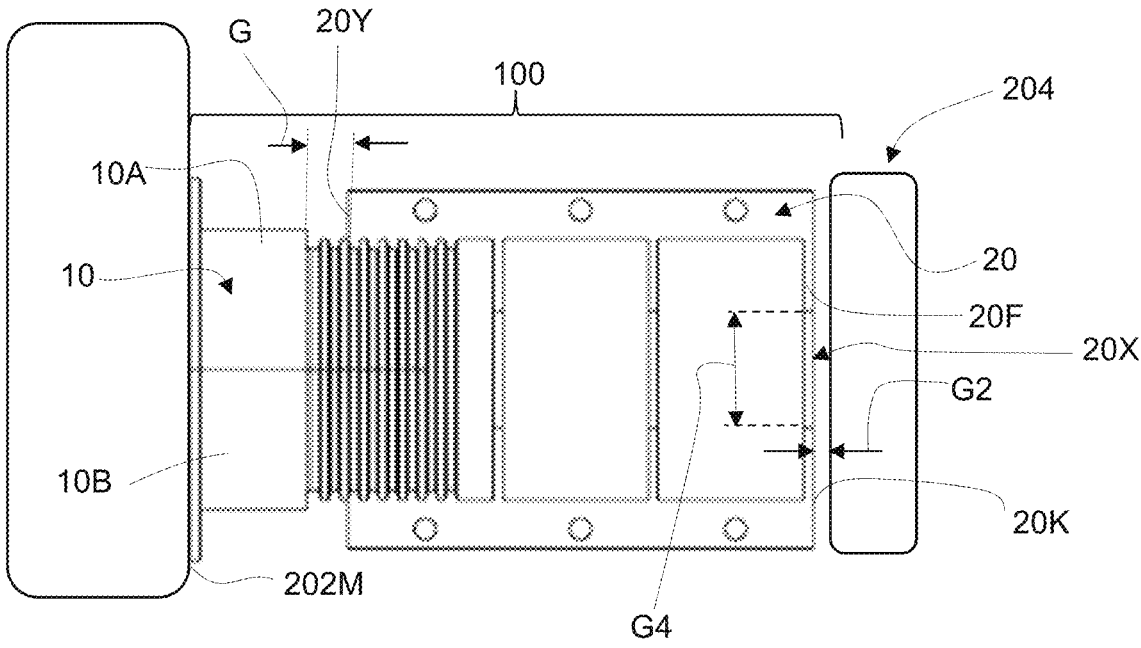
FIG. 16 is a cross sectional view of the shaft guard of FIG. 1 shown in an axially extended state.

The shaft guard 100 has an incremental adjustment feature configured to selectively adjust a longitudinal position of the shaft cover 20 relative to the base 10, the stationary part 202M of the machine 200, and the bearing 204. As shown in FIG. 16, the incremental adjustment feature includes selective engagement of a first predetermined number of the first non-helical tapered trapezoidal threads (14T) for engagement with a second predetermined number of the second non-helical tapered trapezoidal threads (20T). The incremental adjustment feature allows an axial end 20Y of the shaft cover 20 to be set an axial distance G, from the stationary part 202M and to set the free end 20K an axial distance G2 from the bearing 204 to ensure maximum coverage of the shaft 206 (shown in FIG. 2). The incremental adjustments are determined by the pitch P and can be adjusted in one or more increments of the pitch P. The distance G2 is minimized in magnitude to prevent access to the shaft 206 by personal (e.g., fingers) or projectile objects.

In some embodiments, the base 10 and/or the shaft cover 20 are manufactured via an injection molding process from an acrylonitrile butadiene styrene (ABS) high strength plastic material, or other polymers, such as thermosetting polymers that can be injection molded. Use of ABS high strength plastic paired with the geometry of the shaft guard 100 allows for a rigid structure when assembled. The base 10 and shaft cover 20 have about a ⅛ inch thickness throughout with the exception of the outwardly extending circumferential flange 12F. The thickness of the outwardly extending circumferential flange 12F ranges from about ⅛ inch to about ¼ inch depending on the size of the base 10. Weights of the overall shaft guard 100 range from about 1.0 lb. on the smallest size to about 13.0 lbs. on the largest size. While the base 10 and/or the shaft cover 20 are described as being manufactured via an injection molding process from an acrylonitrile butadiene styrene (ABS) high strength plastic material, the present invention is not limited in this regard as other materials may be employed including, but not limited to, acrylic (PMMA), nylon (polyamide, PA), polycarbonate (PC), polyethylene (PE), polyoxymethylene (POM), polypropylene (PP), polystyrene (PS) or combinations thereof.

As will be apparent to those skilled in the art, various modifications, adaptations, and variations of the foregoing specific disclosure can be made without departing from the scope of the invention claimed herein. The various features and elements of the invention described herein may be combined in a manner different than the specific examples described or claimed herein without departing from the scope of the invention. In other words, any element or feature may be combined with any other element or feature in different embodiments, unless there is an obvious or inherent incompatibility between the two, or it is specifically excluded.

References in the specification to "one embodiment," "an embodiment," "some embodiments," etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification.

The singular forms "a," "an," and "the" include plural reference unless the context clearly dictates otherwise. Thus, for example, a reference to "a plant" includes a plurality of such plants. It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition, or step being referred to is an optional (not required) feature of the invention.

The term "and/or" means any one of the items, any combination of the items, or all of the items with which this term is associated. The phrase "one or more" is readily understood by one of skill in the art, particularly when read in context of its usage.

Each numerical or measured value in this specification is modified by the term "about." The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment.

As will be understood by the skilled artisan, all numbers, including those expressing quantities of reagents or ingredients, properties such as molecular weight, reaction conditions, and so forth, are approximations and are understood as being optionally modified in all instances by the term "about." These values can vary depending upon the desired properties sought to be obtained by those skilled in the art utilizing the teachings of the descriptions herein. It is also understood that such values inherently contain variability necessarily resulting from the standard deviations found in their respective testing measurements.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third, and upper third, etc.

As will also be understood by one skilled in the art, all language such as "up to," "at least," "greater than," "less than," "more than," "or more," and the like, include the number recited and such terms refer to ranges that can be subsequently broken down into sub-ranges as discussed above. In the same manner, all ratios recited herein also include all sub-ratios falling within the broader ratio. Accordingly, specific values recited for radicals, substituents, and ranges, are for illustration only; they do not exclude other defined values or other values within defined ranges for radicals and substituents.

One skilled in the art will also readily recognize that where members are grouped together in a common manner, such as in a Markush group, the invention encompasses not only the entire group listed as a whole, but each member of the group individually and all possible subgroups of the main group. Additionally, for all purposes, the invention encompasses not only the main group, but also the main group absent one or more of the group members. The invention therefore envisages the explicit exclusion of any one or more of members of a recited group. Accordingly, provisos may apply to any of the disclosed categories or embodiments whereby any one or more of the recited elements, species, or embodiments, may be excluded from such categories or embodiments, for example, as used in an explicit negative limitation.

What is claimed is:

1. A shaft guard for a machine, the shaft guard comprising:
  a base comprising a mounting segment configured to be secured to a stationary part of the machine and a longitudinal segment extending outwardly from the mounting segment and terminating at a distal end thereof, the longitudinal segment comprising first non-helical threads; and
  a shaft cover extending longitudinally from a connection end to a free end thereof, the shaft cover comprising second non-helical threads;
  wherein at least one of the first non-helical threads engage a respective one of the second non-helical threads to secure the shaft cover to the base.

2. The shaft guard of claim 1, wherein the first non-helical threads comprises first non-helical tapered trapezoidal threads and the second non-helical threads comprises second non-helical tapered trapezoidal threads.

3. The shaft guard of claim 2, wherein the first non-helical tapered trapezoidal threads have a first pitch diameter and the second non-helical tapered trapezoidal threads have a second pitch diameter, the first pitch diameter and the second pitch diameter having interference fit magnitudes.

4. The shaft guard of claim 2, further comprising an incremental adjustment feature configured to selectively adjust a longitudinal position of the shaft cover relative to the base.

5. The shaft guard of claim 4, wherein the incremental adjustment feature comprises selective engagement of a first predetermined number of the first non-helical tapered trapezoidal threads for engagement with a second predetermined number of the second non-helical tapered trapezoidal threads.

6. The shaft guard of claim 2, wherein the first non-helical tapered trapezoidal threads are formed on an exterior surface of the base and the second non-helical tapered trapezoidal threads are formed on an interior surface of the shaft cover.

7. The shaft guard of claim 2, wherein the first non-helical tapered trapezoidal threads are formed on an interior surface of the base and the second non-helical tapered trapezoidal threads are formed on an exterior surface of the shaft cover.

8. The shaft guard of claim 1, wherein at least one of the base and the shaft cover comprise at least one thermosetting polymer and are manufactured via an injection molding process.

9. The shaft guard of claim 1, wherein the base comprises at least a first base segment and a second base segment that longitudinally abut one another.

10. The shaft guard of claim 1, wherein the shaft cover comprises at least a first shaft cover segment and a second shaft cover segment that longitudinally abut one another.

11. The shaft guard of claim 10, wherein the first shaft cover segment and the second shaft cover segment comprises longitudinal lips that engage one another.

12. The shaft guard of claim 1, wherein the mounting segment comprises a radially outwardly extending circumferential flange.

13. The shaft guard of claim 1, wherein the shaft cover is cantilever supported by the base.

14. The shaft guard of claim 1, wherein the shaft cover comprises a radially inward extending circumferential flange.

15. A shaft guard for a machine, the shaft guard comprising:
  a base comprising a mounting segment configured to be secured to a stationary part of the machine and a longitudinal segment extending outwardly from the mounting segment and terminating at a distal end thereof, the longitudinal segment comprising first non-helical threads having a first pitch diameter;
  a shaft cover extending longitudinally from a connection end to a free end thereof, the shaft cover comprising second non-helical threads having a second pitch diameter; and
  an incremental adjustment feature that adjusts a longitudinal position of the shaft cover relative to the base, the incremental adjustment feature comprising engagement of the first and second non-helical threads, wherein the first and second pitch diameters form an interference fit.

16. The shaft guard of claim 15, wherein the first and second non-helical threads comprises tapered trapezoidal threads.

17. The shaft guard of claim 15, wherein the base and/or the shaft cover comprise an injection molded thermoset polymer.

18. The shaft guard of claim 15, wherein the shaft cover comprises a first shaft cover segment and a second shaft cover segment that longitudinally abut one another.

19. The shaft guard of claim 18, wherein the first shaft cover segment and the second shaft cover segment comprises longitudinal lips that engage one another.

20. The shaft guard of claim 15, wherein the first non-helical threads are on an exterior surface of the base and the second non-helical threads are on an interior surface of the shaft cover.

* * * * *